United States Patent
Kanaan et al.

[11] Patent Number: 5,899,648
[45] Date of Patent: * May 4, 1999

[54] BALL SCREW CLAMPING DEVICE

[75] Inventors: Roger J. Kanaan, Easley; Kenneth M. Montjoy, Seneca; Erik G. Han, Anderson; Stephen E. Gibson, Salem, all of S.C.

[73] Assignee: Power Tool Holders Incorporated, Wilmington, Del.

[ * ] Notice: This patent issued on a continued prosecution application filed under 37 CFR 1.53(d), and is subject to the twenty year patent term provisions of 35 U.S.C. 154(a)(2).

[21] Appl. No.: 08/971,757

[22] Filed: Nov. 17, 1997

Related U.S. Application Data

[63] Continuation of application No. 08/759,592, Dec. 5, 1996, abandoned.

[51] Int. Cl.[6] ...................................................... F16B 37/08
[52] U.S. Cl. ................................ 411/432; 411/534; 411/1
[58] Field of Search ..................................... 411/432, 433, 411/408, 428, 534, 525, 1, 6–8; 74/459, 441; 103/259

[56] References Cited

U.S. PATENT DOCUMENTS

| | | | |
|---|---|---|---|
| 3,062,070 | 11/1962 | Beatty | 74/441 |
| 4,941,790 | 7/1990 | Kirn | 411/432 |
| 4,955,744 | 9/1990 | Barth | 411/432 |
| 5,161,334 | 11/1992 | Schaal | 411/432 |
| 5,388,942 | 2/1995 | Bonacina | 411/432 |
| 5,564,875 | 10/1996 | Matthews | 411/432 |
| 5,577,870 | 11/1996 | Nakamura | 411/432 |
| 5,640,749 | 6/1997 | Junkers | 411/432 |

*Primary Examiner*—Flemming Saether
*Attorney, Agent, or Firm*—Dority & Manning, P.A.

[57] ABSTRACT

This invention has as its purpose the provision of a clamp screw in which the loss of clamping force is greatly reduced, a powerful clamping force can be obtained with a small rotational input, a sufficient clamping force can be obtained by a manual operation, and moreover, a sufficient clamping force can be obtained without excessive clamping by making effective use of the reverse thrust of the rotating tool.

With the clamp screw of the invention, when the flange ring is in contact with the object to be attached, the rotation of the threaded member stops and a clamping state is entered, the rotation of the operating ring is screw fed by the balls moving around the thread grooves, and as a result of this movement of the operating ring due to the screw feed, pressure is exerted on the flange ring through the restraining ring thus clamping the tool to be attached.

11 Claims, 8 Drawing Sheets

BALL SCREW CLAMPING DEVICE

This is a continuation of application Ser. No. 08/759,592, filed Dec. 5, 1996, which was abandoned upon the filing hereof.

DETAILED DESCRIPTION

1. Field of Industrial Use

This invention is used as a clamp screw (for example a nut) for clamping a rotating tool such as, for example, the grindstone of a hand-grinder, or a circular hand-saw, to a threaded attachment part (for example a male thread) provided on the drive shaft of an electric tool.

2. Prior Art

When attaching a rotating tool such as said grindstone or circular saw to the drive shaft of an electric tool, in conventional practice a flange and a male thread are formed at the end of the drive shaft, the rotating tool is inserted over this male thread, and a clamp screw formed with a female thread, for example a nut, is screwed on outside of this, this nut then being clamped using a tightening tool such as a wrench.

If the electric tool is a manual type (portable), when using a wrench for clamping as described above, the alignment of the electric tool may be unbalanced, and its work performance may deteriorate. Thus if the above-mentioned clamping nut can be attached by rotation using a manual operation only, work performance will be greatly improved. Moreover, clamping using reverse thrust from the use of the rotating tool will be even more effective. However, when the nut is rotated in a manual operation, a loss in clamping force occurs due to the frictional resistance in the thread portion of said male thread and the female thread of the nut, with the difficulty that it is not possible to create a sufficient clamping force using the force of a manual operation alone. Moreover, there is the disadvantage that if the reverse thrust of the rotating tool is used without being checked, too much clamping may occur so that it cannot be removed.

PROBLEMS TO BE RESOLVED BY THE INVENTION

This invention has as its purpose the provision of a clamp screw in which the loss of clamping force is greatly reduced, a powerful clamping force can be obtained with a small rotational input, a sufficient clamping force can be obtained by a manual operation, and moreover, a sufficient clamping force can be obtained without excessive clamping by making effective use of the reverse thrust of the rotating tool.

MEANS OF RESOLVING THE PROBLEMS

An embodiment of the present invention is characterized by being a clamp screw which is provided with a threaded member with a threaded part having a female or male thread formed on a shaft part and which screws onto a threaded attachment part, and with a shaft-shaped peripheral part formed on its outer surface, an operating ring whose inner part is inserted over the shaft-shaped peripheral part of said threaded member, and to which a rotational force is input externally, and a flange ring fitted facing said operating ring so as to freely rotate on said shaft-shaped peripheral part of said threaded member and permitted a slight movement in the axial direction, and in contact with the attached object, thread grooves of the same respective thread pitch being provided on the inserted and engaged inner and outer surfaces of said threaded member and operating ring, a plurality of balls being fitted into said thread grooves, a restraining ring being installed between said operating ring and flange ring with slight freedom of movement in the axial direction with respect to the threaded member but prevented from rotating, a spring being fitted between said restraining ring and operating ring, which returns said operating ring to its initial position allowing for a set or predetermined number of turns in the clamping range, and a slippage device being fitted between said restraining ring and flange ring in contact with both of these and applying the required frictional resistance.

A thrust bearing may also be included between the operating ring and restraining ring. Further, the balls, in addition to being retained by a retaining ring fitted between the respective thread grooves of the threaded member and the operating ring, may be arranged at a mutual distance with adjacent balls in the direction of the thread pitch having their positions spaced along the direction of thread pitch.

Further, in one embodiment, a thrust bearing is fitted between said operating ring and restraining ring, an adjustment ring is fitted between said thrust bearing and restraining ring, raised parts being formed on one of the circumferences of the respectively opposing surfaces of said adjustment ring and operating ring, contact parts which are able to slip and are sprung against said raised parts being formed on the other.

In a further embodiment of the present invention, a compressible thrust washer is utilized between the restraining ring and flange ring, the thrust washer being somewhat thicker than the thickness of a thrust bearing which is also located between the restraining ring and the flange ring. The surfaces of the restraining ring and flange ring that contact the compressible thrust washer may be roughened such as by sand blasting to provide the desired amount of friction between those surfaces. This arrangement allows self tightening of the clamp screw during use of the tool until such time as sufficient axial forces within the nut compress the compressible thrust washer enough that the thrust bearing allows rotation between the flange ring and other components of the clamp screw to prevent overtightening.

PREFERRED EMBODIMENTS

Preferred embodiments of the invention will now be described with reference to the drawings.

Figure 1:
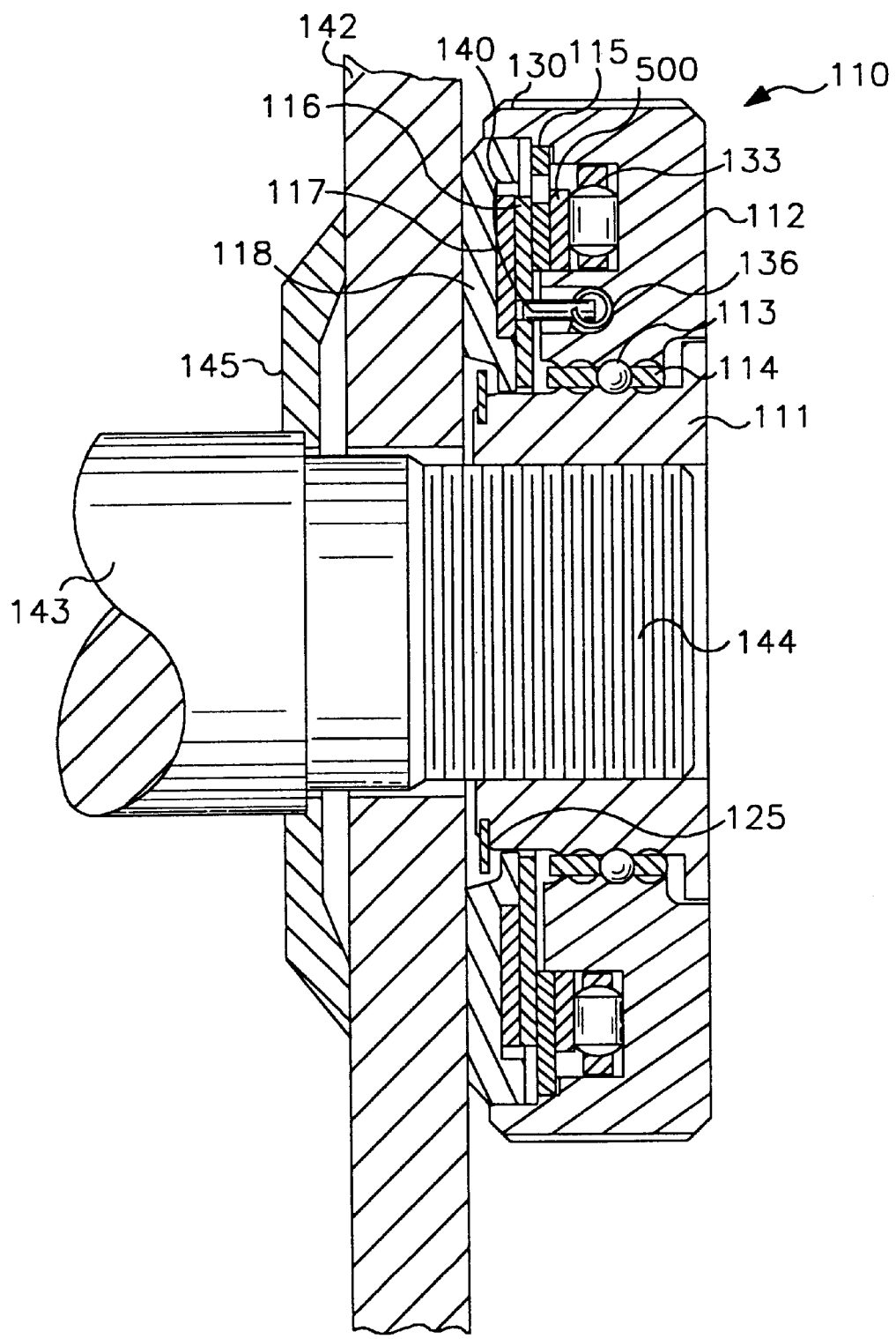
FIG. 1 is a cross section of a clamping screw in accordance with an embodiment of the present invention.
Figure 2:
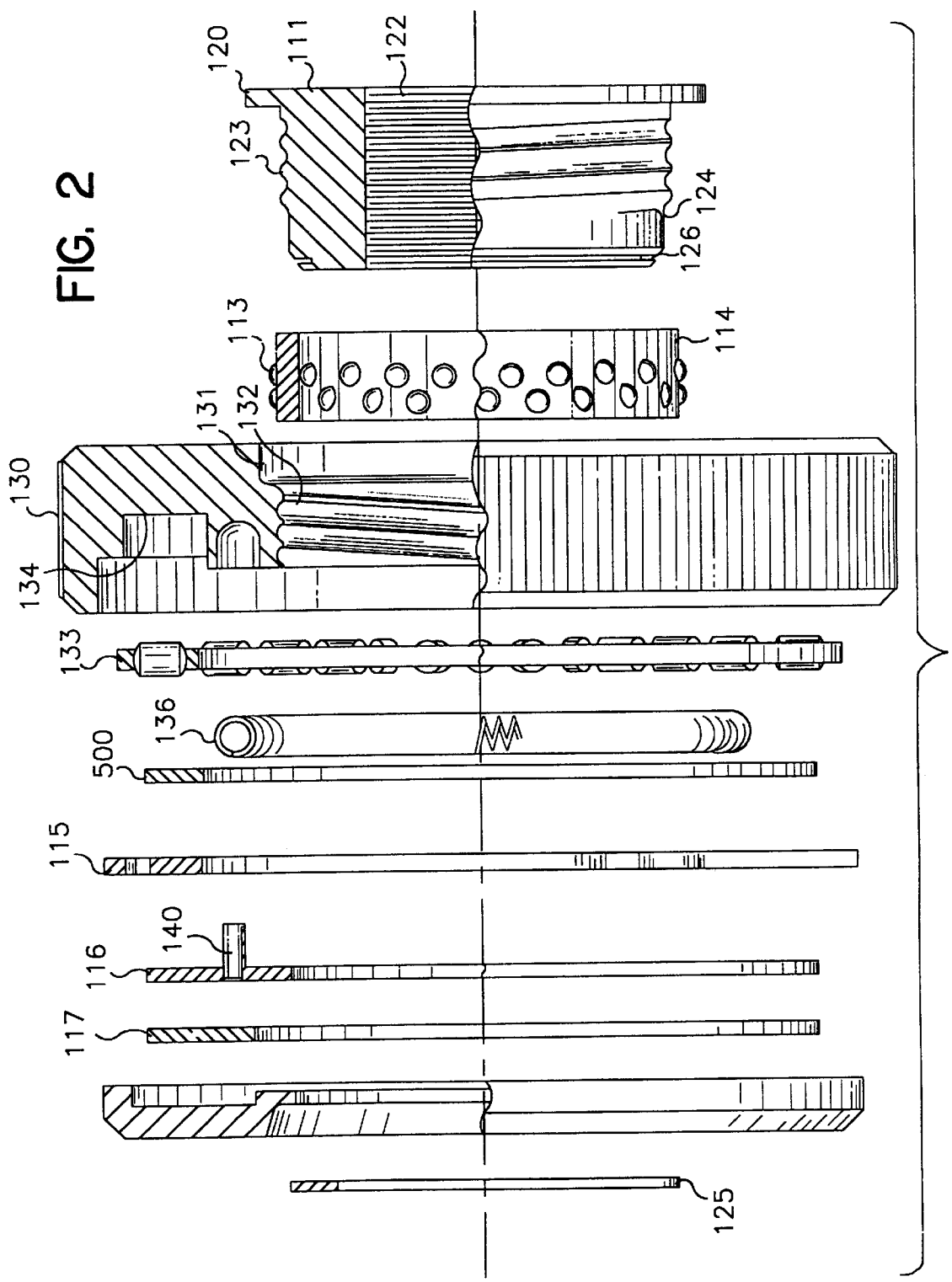
FIG. 2 is an exploded diagram of the embodiment of FIG. 1.
Figure 3:
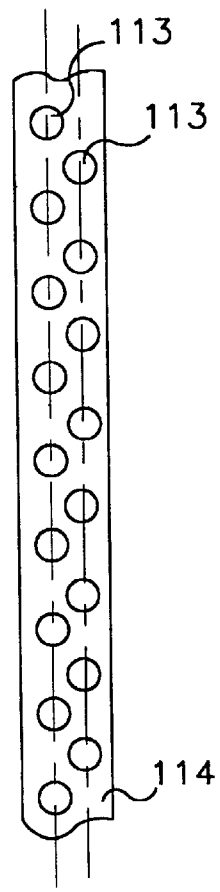
FIG. 3 is a side view of the balls and ball retainer of the embodiment of FIG. 1.

With respect to a preferred embodiment, FIGS. 1 and 2 show a clamp screw 110. Clamp screw 110 is provided with cylindrical threaded member 111, ring-shaped operating ring 112, cylindrical retaining ring 114 which retains balls 113, disk-shaped adjustment click ring 115, disk-shaped restraining ring 116, disk-shaped thrust washer 117, and ring-shaped flange ring 118. Clamp screw 110 further includes thrust washer 500.

As illustrated in FIG. 2, at the end of said threaded member 111 is formed a collar part 120. Engagement holes (not illustrated) for a wrench may be formed in the outer surface of this collar part 120 or operating ring 112 at an appropriate spacing as would be apparent to one skilled in the art. Female thread 122 is formed on the shaft of said threaded member 111, arc-shaped thread grooves 123 for the movement of above-mentioned balls 113 being formed in the circumference of the shaft on the inner side of said collar part 120, and furthermore on its outside surface are formed spline type slots 124 which engage with the above-mentioned restraining ring 116, and ring slots 126 which stop stopping ring 125.

The above-mentioned operating ring 112 is a ring to which rotational force is input, and is inserted over the shaft-shaped periphery of said threaded member 111, knurl 130 being formed on its outer surface to prevent slipping, and on its outside surface is formed depression 131 (FIG. 2) into which fits collar part 120 of threaded member 111. An optional O-ring (not shown) may be installed between depression 131 and collar part 120 if desired. On the inner surface of operating ring 112 are formed arc-shaped thread grooves 132 for said balls 113 to move around and which have the same thread pitch as said thread grooves 123, and furthermore on the inside surface is formed depression 134 which accommodates thrust bearing 133, thrust bearing 133 thus accommodated being in contact with the thrust washer 500 which is in contact with the side of adjustment click ring 115 mentioned above. Groove 135 (FIG. 4) is for accommodating spring 136 to be described later. Furthermore said thread grooves 123, 132 need not be arc-shaped but may be the conventional triangular shape or any other conventional shape. As set forth above, thrust washer 500 is received between thrust bearing 133 and adjustment click ring 115.

The above-mentioned balls 113 are retained within retaining ring 114 so as to be able to rotate around with a plurality of balls spaced at the required intervals, and moreover balls 113 are arranged at a mutual distance with adjacent balls 113, 113 in the direction of the thread pitch having their positions spaced without clustering along the direction of thread pitch, and by having this structure it is arranged that the width of the thread pitch can be formed smaller than the diameter of balls 113. The lead angle of screw grooves 123, 132 is set smaller than the lead angle of female thread 122 of said threaded member 111. It should be appreciated that retaining ring 114 could be eliminated in certain embodiments.

Figure 4:
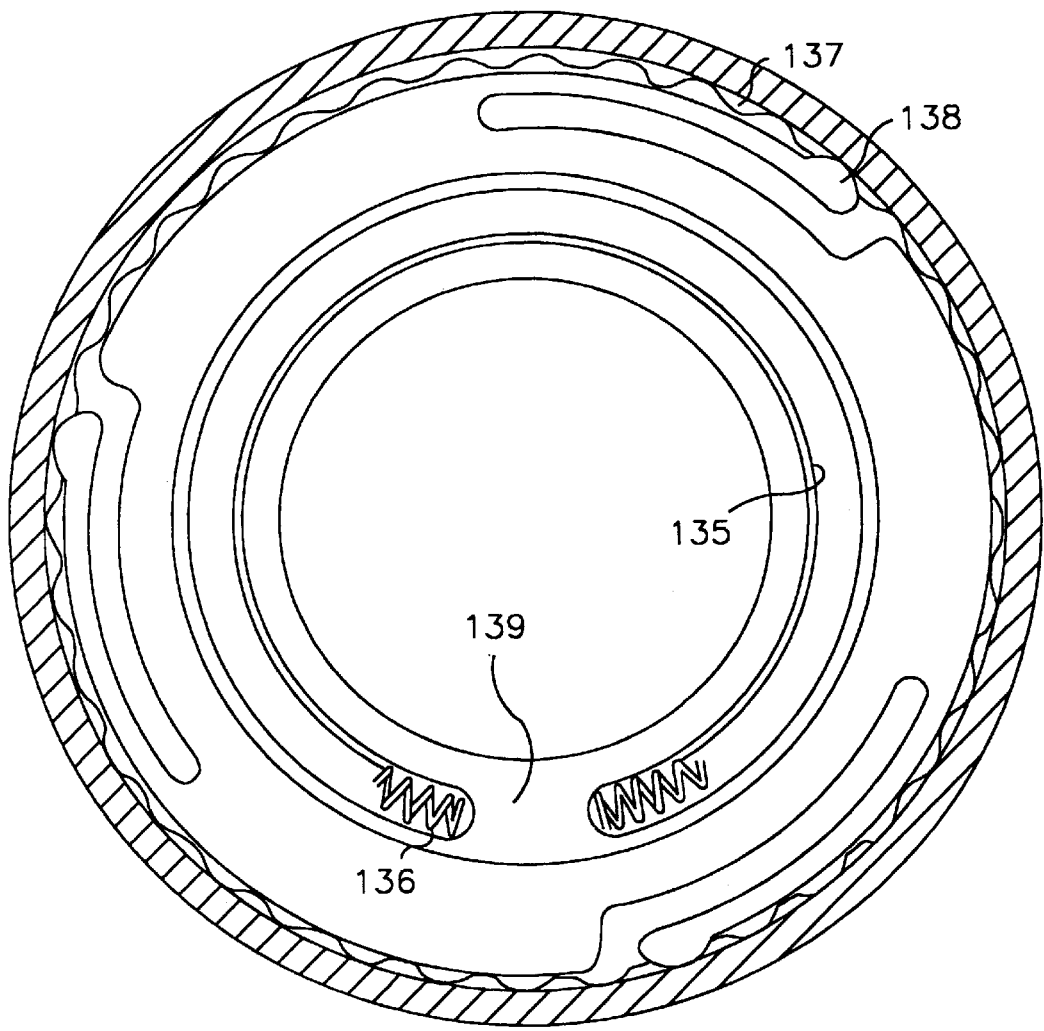
FIG. 4 is a cross section of FIG. 1 taken between the restraining ring and the adjustment ring.

As shown in FIG. 4, raised parts 137 are formed on the inner surface of the inside of the above-mentioned operating ring 112, and contact parts 138 formed in three positions on the outer surface of adjustment ring 115 are made to engage with these raised parts 137. The above-mentioned contact parts 138 have an elasticity through being formed via a long neck from said adjustment ring 115, and due to this elasticity contact parts 138 are sprung against said raised parts 137, and when these raised parts 137 and contact parts 138 rotate against one another, in addition to obtaining adjustment of the rotation of operating ring 112, an adjustment noise or click is generated due to the engagement of contact parts 138 in the depressions. While contact parts 138 are illustrated at three positions, it should be appreciated that more or fewer could be provided.

In housing groove 135 of the above-mentioned operating ring 112 is a stopper portion 139, this stopper portion 139 restrains both ends of spring 136 accommodated in housing groove 135. A restrainer 140 is formed in the above-mentioned restraining ring 116 for engagement with spring 136 and oriented so that said operating ring 112 can be returned to its initial position when the clamping load is released from operating ring 112. While restrainer 140 is illustrated as a pin attachment to restraining ring 116, it can be formed as a part of restraining ring 116 by bending a portion of ring 116 into position or in any other known manner.

Figure 5:
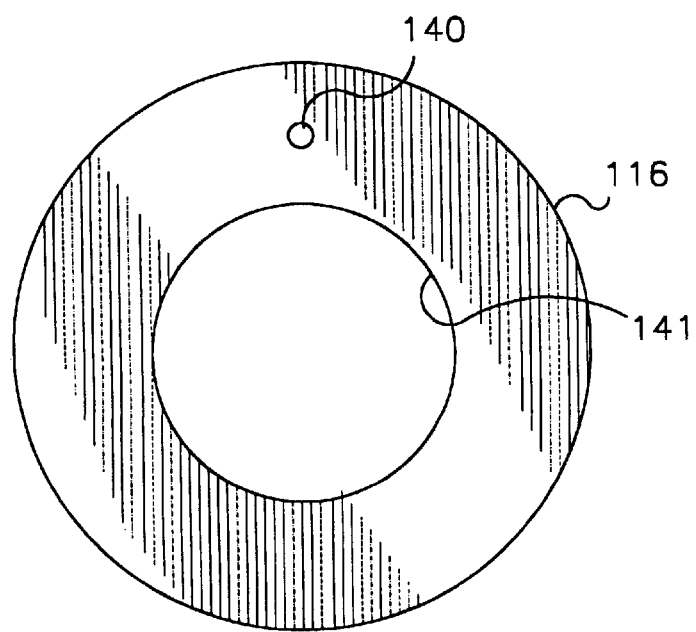
FIG. 5 is a plan view of the restraining ring.

As illustrated in FIG. 5, restraining ring 116 has spline grooves 141 formed on its inner surface, which engage with spline grooves 124 of above-mentioned threaded member 111, and even with slight movement permitted in the axial direction of said threaded member 111, is fitted to threaded member 111 so that rotation is prevented. While referred to herein as spline grooves, it should be appreciated that this is intended to describe any configuration that prevents restraining ring 116 from rotating on threaded member 111.

Disk-shaped thrust washer 117 may have a coefficient of friction so that the clamping of operating ring 112 due to the reaction of rotating tool 142 on thread grooves 123, 132 is not excessive, and is set so that the value ensuring slipping occurs with further rotation.

The above-mentioned flange ring 118 is fitted to rotate at the end of spline grooves 124 of threaded member 111 with a slight degree of movement permitted in the axial direction, its outside surface applying clamping pressure against rotating tool 142.

A male thread 144 for attachment is located on the end of drive shaft 143 of the electric tool, rotating tool 142 being fitted to this male screw 144 via an inner flange 145, and is fixed on using a clamp screw 110 of a structure as described above.

In other words, female thread 122 of threaded member 111 is screwed onto male screw 144 of drive shaft 143. In a state where the flange ring 118 is not in contact with rotating tool 142, in other words where no load is applied to said flange ring 118, it is screwed on just like a single nut, rotating as a unit through the assembled resistance of the structural elements of clamp screw 110.

When flange ring 118 comes into contact with the side of rotating tool 142 and stops, the rotation of threaded member 111 also stops simultaneously, at which point a clamping state is entered. In other words if operating ring 112 is further rotated in the direction of clamping in this state, balls 113 retained in retaining ring 114 move around thread grooves 123, 132, and operating ring 112 is screw fed. Moreover, the movement of these balls 113 has virtually no frictional resistance, so the rotation of operating ring 112 can be effectively transmitted without loss of the operating force.

The screw feed of the above-mentioned operating ring 112 applies pressure through thrust bearing 133 and thrust washer 500 to adjustment ring 115, restraining ring 116 and thrust washer 117, and furthermore exerts pressure on flange ring 118 so that rotating tool 142 is firmly clamped.

When the above-mentioned operating ring 112 enters a clamping state, since restraining ring 116 does not rotate, when operating ring 112 rotates spring 136 is compressed in the direction of clamping.

Furthermore as the rotation of operating ring 112 is transmitted effectively and without loss of operating power, a strong fixed clamping can be obtained from a small rotational force (operating force) and sufficient clamping can be obtained from manual operation.

Moreover there is virtually no friction with the face of adjustment ring 115 with respect to the rotation of operating ring 112 due to thrust bearing 133 being fitted, so there is no loss of this part of the force and it can make the rotation of the operating ring more effective.

As described above, when operating ring 112 is rotated in the clamping state, at this point adjustment ring 115 comes under pressure and stops, so that a relative movement against operating ring 112 occurs, with raised parts 137 on the inside surface of operating ring 112 riding over contact parts 138 of adjustment ring 115 and rotating, an adjustment and an adjustment noise being obtained from operating ring 112 each time they ride over, and as a result of this contact the operator is able to confirm that a clamping state has been achieved.

When rotating tool 142 has been fixed as described above and this rotating tool 142 is used, the reverse thrust caused by the resistance in use is transmitted to flange ring 118, and this is rotated in the direction of clamping. This reverse rotation is transmitted to thrust washer 117 and restraining ring 116 until thrust washer 117 slips, and a relative rotation in the direction of clamping occurs between this adjustment ring 115 and operating ring 112, the mutual clamping force is increased, and due to this increased clamping force (extra clamping) a more effective clamping can be obtained. However, where a reverse rotation greater than the coefficient of friction of thrust washer 117 occurs, slipping will occur between thrust washer 117 and flange ring 118, so that over-clamping can be prevented.

When removing clamp screw 110 attached as described above, operating ring 112 is rotated in the direction of loosening. Whilst the flange ring 118 is in contact with rotating tool 142, this rotation also causes screw feed of operating ring 112 due to balls 113 and thread grooves 123, 132. Moreover, due to the fact that there is virtually no frictional resistance due to the rotation of the balls 113, this screw feed is effectively transmitted with a small manual rotational force so that clamping and loosening are possible.

Moreover, when the clamping of flange ring 118 is released, clamp screw 110 rotates as a unit due to the assembled resistance of the structural elements, the rotation of operating ring 112 becomes the rotation of threaded member 111, and female thread 122 of said threaded member 111 can be removed from male thread 144 of drive shaft 143.

Furthermore, when the clamping load is released from operating ring 112, the elastic force of compressed spring 136 returns operating ring 112 to its initial waiting position with respect to restraining ring 116.

In the embodiment described above, when flange ring 118 comes into contact with rotating tool 142, the rotation of threaded member 111 stops and it enters a clamping state, the rotation of said operating ring 112 during screw feed of operating ring 112 has virtually no frictional resistance due to the movement of balls 113 around thread grooves 123, 132, so the rotational force of operating ring 112 can be transmitted effectively and without loss to flange ring 118, it is possible to fix the clamp strongly even with a small rotational force, and manual operation can be made to exert a sufficient clamping force. Moreover, as thrust washer 117 is fitted, a more effective clamping is obtained due to the increased clamping force (extra clamping) resulting from the reverse rotation of rotating tool 142. In addition, when the forces generated by reverse rotation are greater than the level of friction between thrust washer 117 and flange ring 118, slippage occurs between thrust washer 117 and the flange ring 118, thus preventing over-clamping.

Moreover, since there is virtually no frictional resistance between operating ring 112 and restraining ring 116 during the above-mentioned clamping state because of thrust bearing 133, there is no loss of rotational force in said part, and a small operating force such as a hand movement can be made more efficiently and effectively to have sufficient effect as a clamping force.

Furthermore, since the spacing of balls 113 in retaining ring 114 is arranged at a mutual distance with adjacent balls 113 in thread grooves 123, 132 in the direction of the thread pitch having their positions spaced along the direction of thread pitch, it is possible to have the thread pitch of thread grooves 123, 132 smaller than the diameter of balls 113, the lead angle of thread grooves 123, 132 can be small, and as a result a greater multiplication of the operating force is obtained, and effective clamping is obtained.

Moreover, when operating ring 112 enters the clamping state, raised parts 137 and contact parts 138 slip against each other due to the relative rotation between operating ring 112 and adjustment ring 115, generating an adjustment and an adjustment noise, and it is possible to verify the clamping state by this adjustment and adjustment noise.

With respect to another embodiment of the present invention, FIGS. 6–9 show a clamp screw 210. Clamp screw 210 is provided with cylindrical threaded member 211, ring-shaped operating ring 212, cylindrical retaining ring 214 which retains balls 213, disk-shaped adjustment click ring 215, disk-shaped restraining ring 216, disk-shaped thrust washer 217, and ring-shaped flange ring 218. Clamp screw 210 further includes thrust washer 600. Located between operating ring 212 and thrust washer 600 is a thrust bearing 233, and located between restraining ring 216 and flange ring 218 is a thrust bearing 602 as will be described in more detail below.

Figure 8:
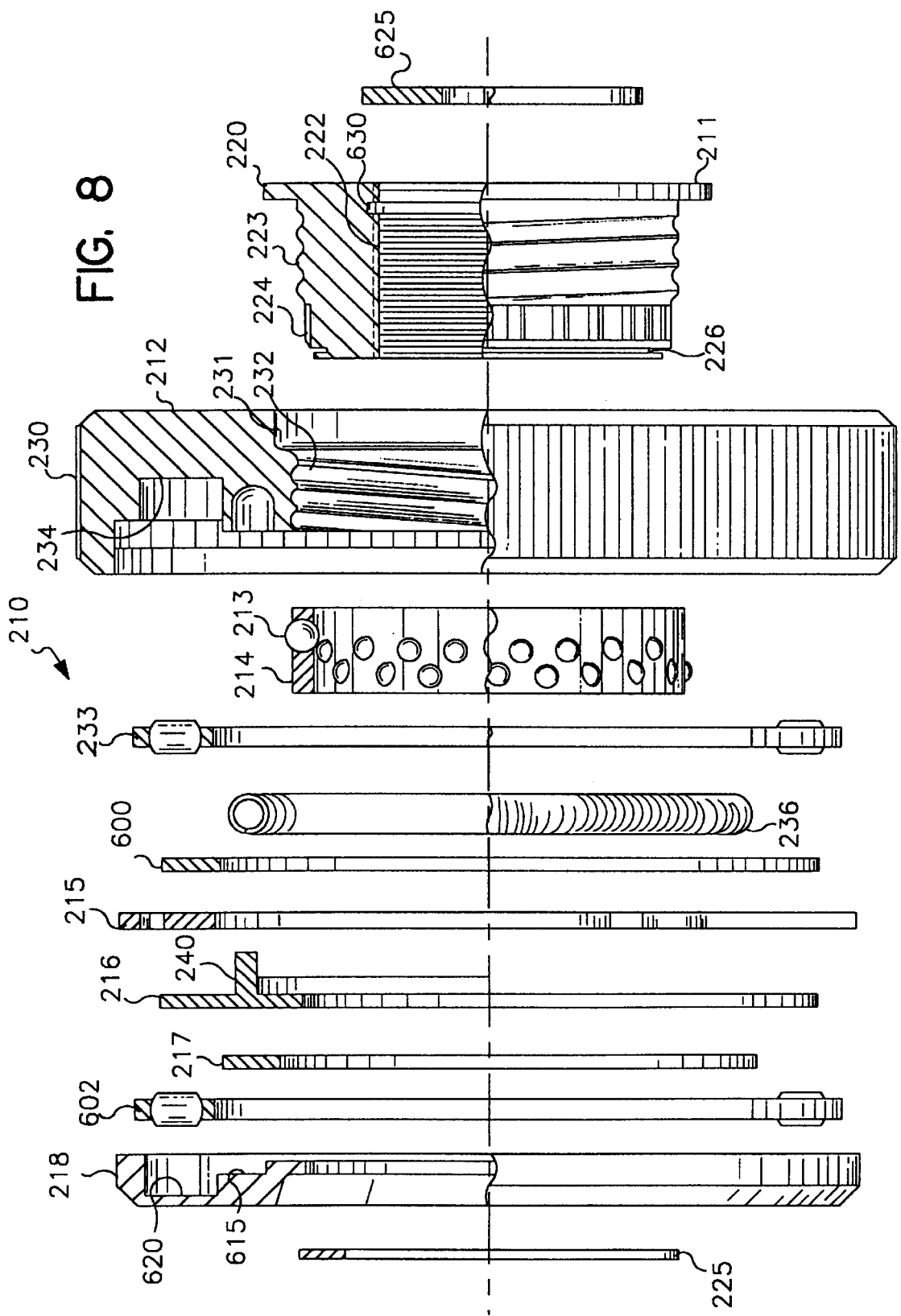
FIG. 8 is an exploded diagram of the embodiment of FIG. 6.

As best illustrated in FIG. 8, at the end of threaded member 211 is formed a collar part 220. Engagement holes (not illustrated) for a wrench may be formed in the outer surface of this collar part 220 or operating ring 212 at an appropriate spacing as discussed with respect to the previous embodiment. Female thread 222 is formed on the shaft of said threaded member 211, arc-shaped thread grooves 223 for the movement of above-mentioned balls 213 being formed in the circumference of the shaft on the inner side of said collar part 220, and furthermore on its outside surface are formed spline type slots 224 which engage with the above-mentioned restraining ring 216, and ring slot 226 which receives stopping ring 225.

The above-mentioned operating ring 212 is a ring to which rotational force is input, and is inserted over the shaft-shaped periphery of said threaded member 211, knurl 230 being formed on its circumferential outer surface to prevent slipping, and on its outside surface is formed depression 231 into which fits collar part 220 of threaded member 211. An optional O-ring (not shown) may be installed as set forth in the embodiment described above. On the inner surface of operating ring 212 are formed arc-shaped thread grooves 232 for said balls 213 to move around and which have the same thread pitch as said thread grooves 223, and furthermore on the inside surface of operating ring 212 is formed depression 234 which accommodates thrust bearing 233, thrust bearing 233 thus accommodated being in contact with the thrust washer 600 which is in contact with the side of adjustment click ring 215 mentioned above. Groove 235 (FIG. 7) in operating ring 212 is for accommodating springs 236 to be described later. Furthermore thread grooves 223, 232 need not be arc-shaped but may be the conventional triangular shape or any other conventional shape. As set forth above, thrust washer 600 is received between thrust bearing 233 and adjustment click ring 215.

The above-mentioned balls 213 are retained within retaining ring 214 so as to be able to rotate around with a plurality of balls spaced at the required intervals, and moreover balls 213 are arranged at a mutual distance with adjacent balls 213, 213 in the direction of the thread pitch having their positions spaced without clustering along the direction of thread pitch, and by having this structure it is arranged that the width of the thread pitch can be formed smaller than the diameter of balls 213. The lead angle of screw grooves 223, 232 is set smaller than the lead angle of female thread 222 of said threaded member 211. It should be appreciated that retaining ring 214 could be eliminated in certain embodiments.

Figure 7:
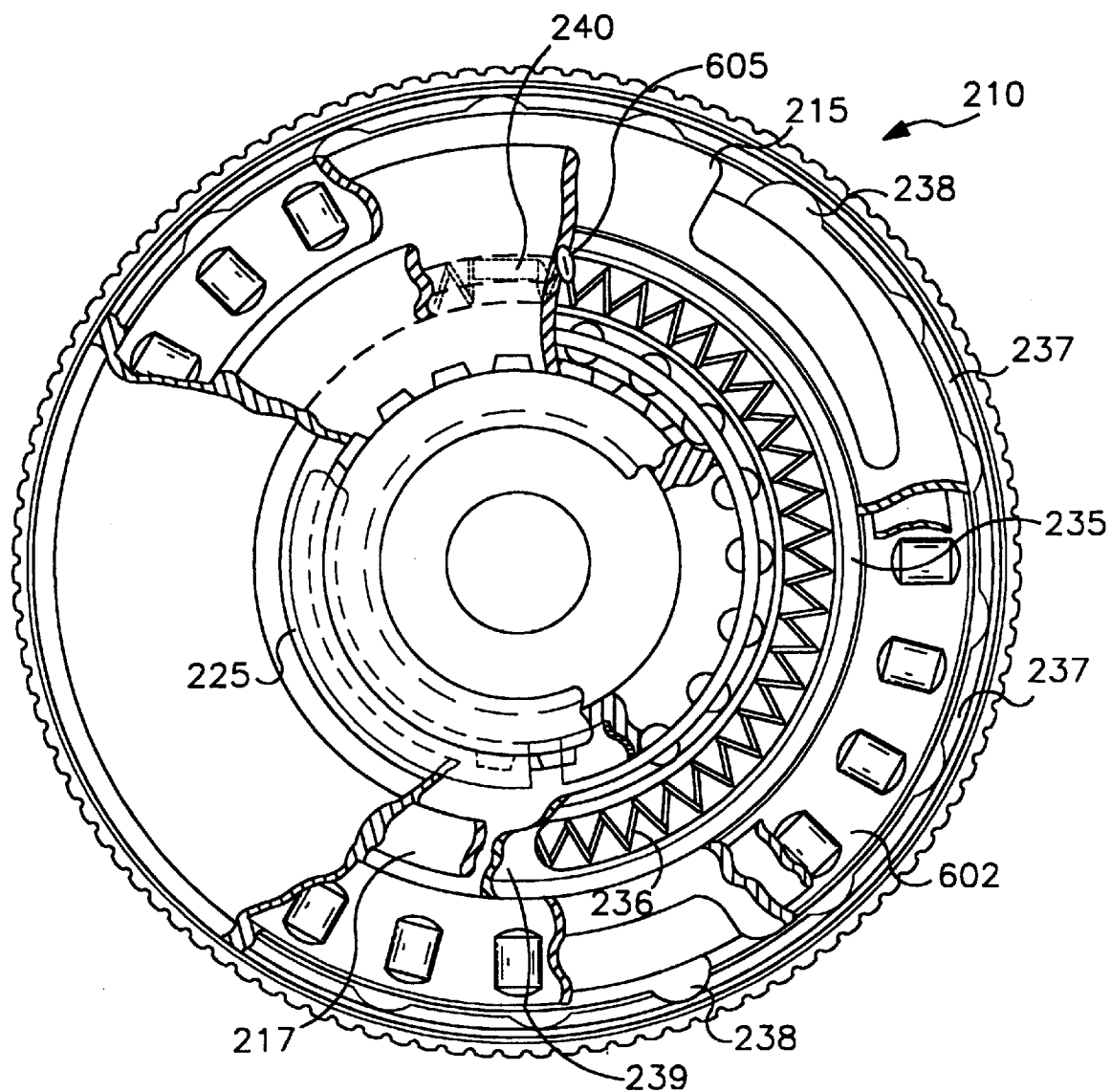
FIG. 7 is a bottom partially sectioned view showing the relative arrangement of the components of the embodiment of FIG. 6.

As shown in FIG. 7, raised parts 237 are formed on the inner surface of the inside of the above-mentioned operating ring 212, and contact parts 238 formed in three positions on the outer surface of adjustment ring 215 are made to engage with these raised parts 237. The above-mentioned contact parts 238 have an elasticity through being formed via a long neck from said adjustment ring 215, and due to this elasticity contact parts 238 are sprung against said raised parts 237, and when these raised parts 237 and contact parts 238 rotate against one another, in addition to obtaining adjustment of the rotation of operating ring 212, an adjustment noise or click is generated due to the engagement of contact parts 238 in the depressions between raised parts 237. While contact parts 238 are illustrated at three positions, it should be appreciated that more or fewer could be provided.

In housing groove 235 of the above-mentioned operating ring 212 is a stopper portion 239. This stopper portion 239 restrains one end of each of the two springs 236 accommodated in housing groove 235. A restrainer 240 is formed in the above-mentioned restraining ring 216 for engagement with the other ends of springs 236 and oriented so that said operating ring 212 can be returned to its initial position when the clamping load is released from operating ring 212. Restrainer 240 is illustrated as and extension of restraining ring 216. Of course, it can be constructed to operate in conjunction with restraining ring 216 in any way that will serve the same purpose. Restraining ring 216 further includes two stop portions 605, 610 which either form a part of or are attached to restraining ring 216. In a preferred embodiment, these stop portions extend in an arcuate path away from restrainer 240. Of course, any configuration that accomplishes the same purpose could be utilized. Upon an attempted overtightening or loosening with excessive force, such as by use of a hand tool, stopper portion 239 of operating ring 212 will engage one of the stop portions rather than restrainer 240. Since stop portions 605, 610 have more area of connection to restraining ring 216, they will be less likely to be broken off in an excessive tightening or loosening situation than would restrainer 240. Stop portions 605, 610 will also assist in preventing spring damage in the above conditions. As embodied herein, two springs 236 are utilized, separated by stopper portion 239 of operating ring 212 and restrainer 240 of restraining ring 216. It should be appreciated that a single spring or multiple springs with varying elasticity could be utilized as would be understood by one skilled in this area.

Figure 9:
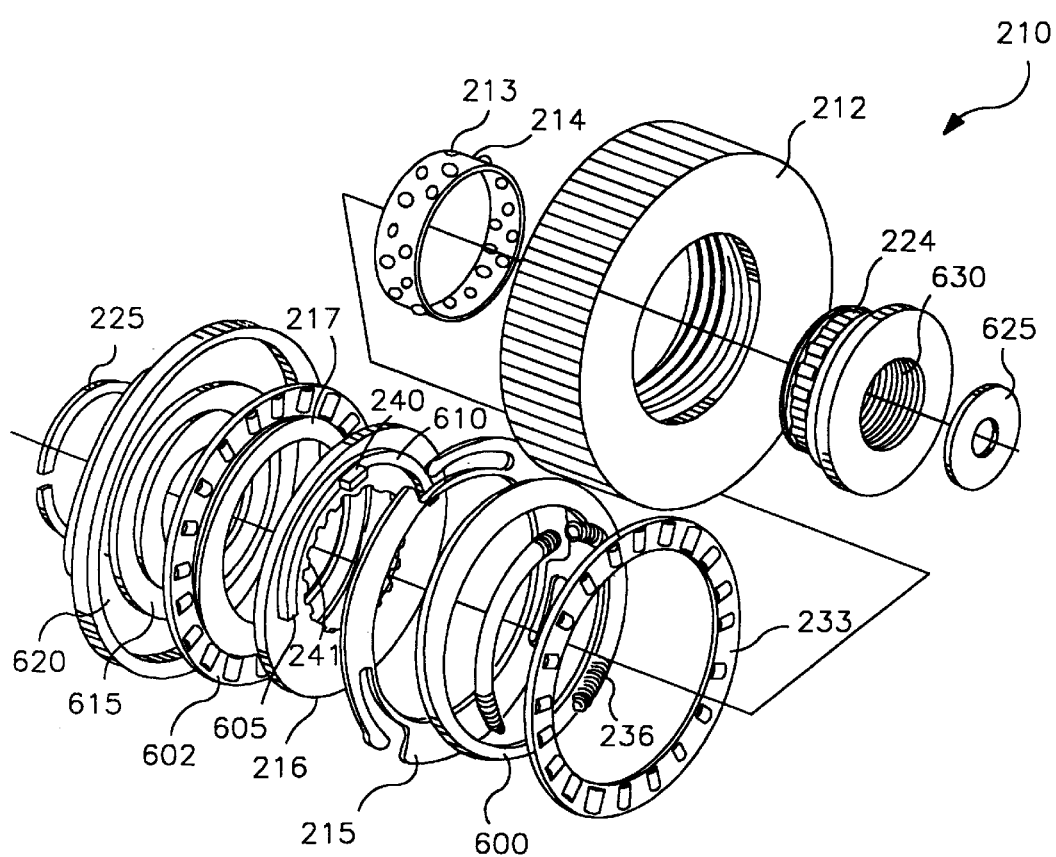
FIG. 9 is an exploded perspective view of a clamping nut in accordance with the embodiment of FIG. 6.

As illustrated in FIG. 9, restraining ring 216 has spline grooves 241 formed on its inner surface, which engage with spline grooves 224 of above-mentioned threaded member 211, and even though slight movement is permitted in the axial direction of said threaded member 211, restraining ring 216 is fitted to threaded member 211 so that rotation is prevented. While referred to herein as spline grooves, it should be appreciated that this is intended to describe any configuration that prevents restraining ring 216 from rotating on threaded member 211.

Figure 6:
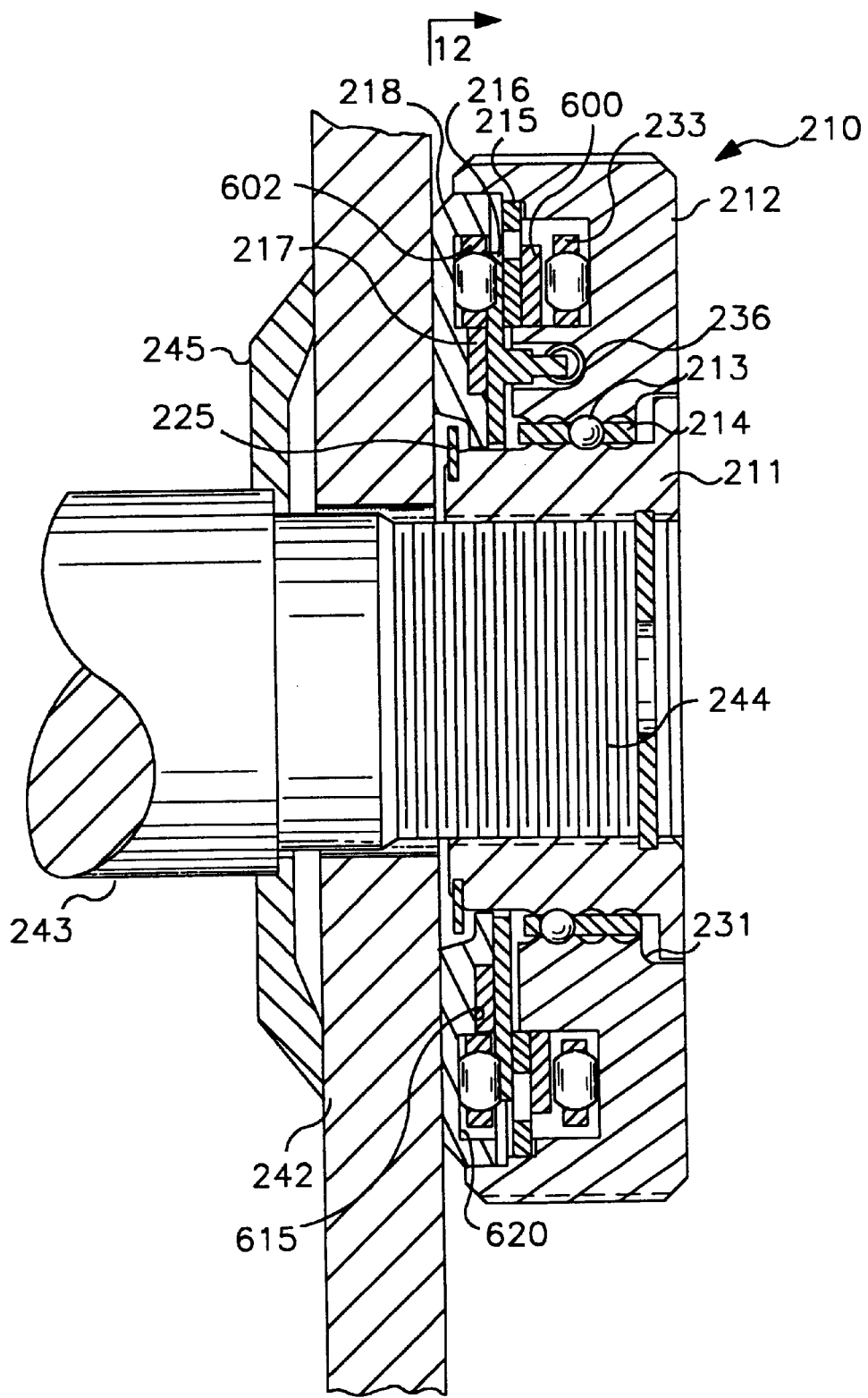
FIG. 6 is a cross section of a clamp screw in accordance with another embodiment of the present invention.

As illustrated in FIGS. 6–9, disk-shaped thrust washer 217 is constructed of a compressible material and in a preferred embodiment is constructed of polyurethane. Thrust bearing 602 is located between restraining ring 216 and flange ring 218, Thrust washer 217 is also located between restraining ring 216 and flange ring 218, but is located circumferentially within thrust bearing 602. As best illustrated in FIGS. 6 and 9, thrust washer 217 is located on a first shelf 615 of flange ring 218 and thrust bearing 602 is located on a second shelf 620 of flange ring 218. The axial height of the shelf 615 and washer 217 is slightly greater than the axial height of the shelf 620 and bearing 602 so that in an untightened state, restraining ring 216 does not contact bearing 602, but is supported on washer 217. As axial forces build up within the clamping screw due to the tendency during operation of the tool for the clamping nut to continue to tighten, washer 217 will compress enough to allow contact between restraining ring 216 and bearing 602 which will enable relative movement between flange ring 218 and restraining ring 216 to prevent overtightening of clamp screw 210 during operation. The thickness and material of the washer 217 can be set by one skilled in the art so that the clamping of operating ring 212 due to the reaction of rotating tool 242 on thread grooves 223, 232 is not excessive, and is set so that the value ensuring slipping occurs with further rotation. In a preferred embodiment, the surfaces of either or both the flange ring or the restraining ring that contact washer 217 may be roughened or otherwise treated to control the coefficient of friction therebetween.

The above-mentioned flange ring 218 is fitted to rotate at the end of spline grooves 224 of threaded member 211 with a slight degree of movement permitted in the axial direction, its outside surface applying clamping pressure against rotating tool 242.

A male thread 244 for attachment is located on the end of drive shaft 243 of the electric tool, rotating tool 242 being fitted to this male screw 244 via an inner flange 245, and is fixed on using a clamp screw 210 of a structure as described above.

In other words, female thread 222 of threaded member 211 is screwed onto male screw 244 of drive shaft 243. In a state where the flange ring 218 is not in contact with rotating tool 242, in other words where no load is applied to said flange ring 218, it is screwed on just like a single nut, rotating as a unit through the assembled resistance of the structural elements of clamp screw 210.

When flange ring 218 comes into contact with the side of rotating tool 242 and stops, the rotation of threaded member 211 also stops simultaneously, at which point a clamping state is entered. In other words if operating ring 212 is further rotated in the direction of clamping in this state, balls 213 retained in retaining ring 214 move around thread grooves 223, 232, and operating ring 212 is screw fed. Moreover, the movement of these balls 213 has virtually no frictional resistance, so the rotation of operating ring 212 can be effectively transmitted without loss of the operating force.

The screw feed of the above-mentioned operating ring 212 applies pressure through thrust bearing 233 and thrust washer 600 to adjustment ring 215, restraining ring 216 and thrust washer and bearing 217, 218, respectively, as set forth above, and furthermore exerts pressure on flange ring 218 so that rotating tool 242 is firmly clamped.

When the above-mentioned operating ring 212 enters a clamping state, since restraining ring 216 does not rotate, when operating ring 212 rotates one of springs 236 is compressed in the direction of clamping.

Furthermore as the rotation of operating ring 212 is transmitted effectively and without loss of operating power, a strong fixed clamping can be obtained from a small rotational force (operating force) and sufficient clamping can be obtained from manual operation.

Moreover there is virtually no friction with the face of adjustment ring 215 with respect to the rotation of operating ring 212 due to thrust bearing 233 being fitted, so there is no loss of this part of the force and it can make the rotation of the operating ring more effective.

As described above, when operating ring 212 is rotated in the clamping state, at this point adjustment ring 215 comes under pressure and stops, so that a relative movement against operating ring 212 occurs, with raised parts 237 on the inside surface of operating ring 212 riding over contact parts 238 of adjustment ring 215 and rotating, an adjustment and an adjustment noise being obtained from operating ring 212 each time they ride over, and as a result of this contact the operator is able to confirm that a clamping state has been achieved.

When rotating tool 242 has been fixed as described above and this rotating tool 242 is used, the reverse thrust caused by the resistance in use is transmitted to flange ring 218, and is rotated in the direction of clamping. This reverse rotation is transmitted to said thrust washer 217 and restraining ring 216 until thrust washer 217 compresses sufficiently that bearing 602 forms the axial load bearing contact between flange ring 218 and restraining ring 216. At this point, rotation will occur between restraining ring 216 and flange ring 218, so that over-clamping can be prevented.

When removing clamp screw 210 attached as described above, operating ring 212 is rotated in the direction of loosening. Whilst the flange ring 218 is in contact with rotating tool 242, this rotation also causes screw feed of operating ring 212 due to balls 213 and thread grooves 223, 232. Moreover, due to the fact that there is virtually no frictional resistance due to the rotation of the balls 213, this screw feed is effectively transmitted with a small manual rotational force so that clamping and loosening are possible.

Moreover, when the clamping of flange ring 218 is released, clamp screw 210 rotates as a unit due to the assembled resistance of the structural elements, the rotation of operating ring 212 becomes the rotation of threaded member 211, and female thread 222 of said threaded member 211 can be removed from male thread 244 of drive shaft 243.

Furthermore, when the clamping load is released from operating ring 212, the elastic force of the compressed spring 236 returns operating ring 212 to its initial waiting position with respect to restraining ring 216.

In the embodiment described above, when flange ring 218 comes into contact with rotating tool 242, the rotation of threaded member 211 stops and it enters a clamping state, the rotation of said operating ring 212 during screw feed of operating ring 212 has virtually no frictional resistance due to the movement of balls 213 around thread grooves 223, 232, so the rotational force of operating ring 212 can be transmitted effectively and without loss to flange ring 218,
it is possible to fix the clamp strongly even with a small rotational force, and manual operation can be made to exert a sufficient clamping force.

Moreover, a more effective clamping is obtained due to the increased clamping force (extra clamping) resulting from the reverse rotation of rotating tool 242. However, overclamping is prevented by the above described mechanism.

Moreover, since there is virtually no frictional resistance between operating ring 212 and restraining ring 216 during the above-mentioned clamping state because of thrust bearing 233, there is no loss of rotational force in said part, and a small operating force such as a hand movement can be made more efficiently and effectively to have sufficient effect as a clamping force.

Furthermore, since the spacing of balls 213 in retaining ring 214 is arranged at a mutual distance with adjacent balls 213 in thread grooves 223, 232 in the direction of the thread pitch having their positions spaced along the direction of thread pitch, it is possible to have the thread pitch of thread grooves 223, 232 smaller than the diameter of balls 213, the lead angle of thread grooves 223, 232 can be small, and as a result a greater multiplication of the operating force is obtained, and effective clamping is obtained.

Moreover, when operating ring 212 enters the clamping state, raised parts 237 and contact parts 238 slip against each other due to the relative rotation between operating ring 212 and adjustment ring 215, generating an adjustment and an adjustment noise, and it is possible to verify the clamping state by this adjustment and adjustment noise.

A resilient washer 625 may be provided such as in a groove 630 near the end of clamping screw 210 that would be away from the tool 242 during operation. This washer would assist in preventing the threads 222 from engaging the threads on a mating device if an attempt was made to install the clamping screw backwards. Such a washer would provide a high frictional engagement between the clamping screw and the shaft received therein. While a washer is illustrated herein, it should be appreciated that other mechanisms that would prevent thread engagement in an attempted backwards assembly would be within the scope of the present invention.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to be limitative of the invention so further described in such appended claims. For example, female thread 122, 222 of threaded member 111, 211 may be replaced with a male thread to be received in a female thread of another device. It should be appreciated that although the device is illustrated in use in conjunction with a rotating tool, the present invention has applicability beyond this illustrated embodiment. Threaded member 111, 211 may be configured as a nut with internal threads or a bolt with external threads, and in either case would mate with the appropriate corresponding male or female part in applications that could benefit from the advantages of this invention.

What is claimed is:

1. A clamp screw for use in conjunction with a device, said clamp screw including:

(a) a threaded member with a threaded part having a female or male thread formed on a shaft portion and which is adapted to screw onto a threaded attachment part of a device, said threaded member having a shaft-shaped peripheral part formed on its outer surface;

(b) an operating ring, said operating ring including an inner part which is inserted over the shaft-shaped peripheral part of said threaded member, said operating ring being adapted to receive an externally input rotational force;

(c) an outer surface of said threaded member and an inner surface of said operating ring including thread grooves thereon for receipt of one or more balls therein;

(d) at least one one of said balls received in said thread grooves in the threaded member and operating ring;

(e) a flange ring received on said shaft-shaped peripheral part of said threaded member so as to freely rotate and have limited axial movement, said flange ring being adapted to contact the object to be attached by the clamp screw.

2. A clamp screw as set forth in claim 1 above, and further including a restraining ring between said operating ring and flange ring, said restraining ring being rotationally fixed and configured for limited axial movement.

3. A clamp screw as set forth in claim 2 above, said clamp screw further including a thrust bearing located between said operating ring and restraining ring.

4. A clamp screw as set forth in claim 2 above, and further including a spring mechanism located between said restraining ring and said operating ring, said spring mechanism being configured to assist in returning said operating ring to a initial position upon application of a release rotational force on said operating ring.

5. A clamp screw as set forth in claim 4 above, said clamp screw further including an adjustment click ring located between said thrust bearing and said restraining ring.

6. A clamp screw as set forth in claim 5 above, said clamp screw further including a thrust washer located between said thrust bearing and said adjustment click ring.

7. A clamp screw as set forth in claim 1, and further including a mechanism for preventing overtightening during operation, said mechanism including a compressible thrust washer and bearing arrangement configured to allow a limited amount of tightening of the clamp screw during operation.

8. A clamp screw as set forth in claim 7, wherein said mechanism for preventing overtightening is configured so that the thrust washer transmits axial force to the operating ring during operation of the device until the axial force in the clamp screw causes said thrust washer to compress sufficiently so that the bearing arrangement forms the operative connection between the flange ring and the operating ring and allows relative rotation therebetween to prevent overtightening.

9. A clamp screw for clamping in conjunction with a device, said clamp screw including:

(a) a threaded member with a threaded part having a female or male thread formed on a shaft portion and which is adapted to screw onto a threaded attachment part of a device, said threaded member having a shaft-shaped peripheral portion formed on its outer surface;

(b) an operating ring, said operating ring including an inner part which is inserted over the shaft-shaped peripheral portion of said threaded member, said operating ring being adapted to receive an externally input rotational force;

(c) thread grooves provided in the inner and outer surfaces of the operating ring and threaded member;

(d) a plurality of balls being fitted into said thread grooves in the threaded member and operating ring;

(e) a flange ring received on said shaft-shaped peripheral part of said threaded member so as to have limited axial movement, said flange ring being adapted to contact an object to be attached by the clamp screw;

(f) a restraining ring between said operating ring and flange ring, said restraining ring being rotationally fixed and configured for limited axial movement;

(g) a spring mechanism located between said restraining ring and said operating ring, said spring mechanism being configured to assist in returning said operating ring to its initial position upon application of a release rotational force on said operating ring;

(h) a thrust bearing located between said operating ring and restraining ring;

(i) an adjustment click ring located between said thrust bearing and said restraining ring; and (j) a thrust washer located between said thrust bearing and said adjustment click ring.

10. A clamp screw as set forth in claim 9 above, wherein a bearing cage retains said ball between the respective thread grooves of the threaded member and the operating ring.

11. A clamp screw as set forth in claim 9 above, wherein said balls are arranged at a mutual distance with adjacent balls in the direction of the thread pitch and having their positions spaced along the direction of the thread pitch.

* * * * *